United States Patent
Kao et al.

(10) Patent No.: US 11,050,643 B2
(45) Date of Patent: Jun. 29, 2021

(54) METHOD FOR MANAGING SOFTWARE SERVICE, AND SERVER

(71) Applicant: PEGATRON CORPORATION, Taipei (TW)

(72) Inventors: Wen-Yen Kao, Taipei (TW); Shen-Hau Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/833,716

(22) Filed: Mar. 30, 2020

(65) Prior Publication Data
US 2020/0403887 A1 Dec. 24, 2020

(30) Foreign Application Priority Data
Jun. 19, 2019 (TW) .................................. 108121313

(51) Int. Cl.
*G06F 15/173* (2006.01)
*H04L 12/24* (2006.01)
*G06F 9/50* (2006.01)
*G06F 9/54* (2006.01)

(52) U.S. Cl.
CPC ........ *H04L 41/5048* (2013.01); *G06F 9/5055* (2013.01); *G06F 9/547* (2013.01); *H04L 41/0806* (2013.01); *H04L 41/0813* (2013.01); *H04L 41/0893* (2013.01); *H04L 41/12* (2013.01); *H04L 41/5054* (2013.01)

(58) Field of Classification Search
CPC ... G06F 9/5055; G06F 9/547; H04L 41/0806; H04L 41/0813; H04L 41/0893; H04L 41/12; H04L 41/5048; H04L 41/5054

USPC .................................................. 709/202, 223
See application file for complete search history.

(56) References Cited

U.S. PATENT DOCUMENTS

| | | | |
|---|---|---|---|
| 6,363,411 B1 * | 3/2002 | Dugan .............. | H04M 3/42136 379/201.01 |
| 6,779,030 B1 * | 8/2004 | Dugan .............. | H04M 3/42136 379/221.08 |
| 8,627,328 B2 * | 1/2014 | Mousseau ................. | G06F 9/50 718/104 |
| 8,677,318 B2 | 3/2014 | Mohindra et al. | |

(Continued)

FOREIGN PATENT DOCUMENTS

CN 101454766 10/2012

*Primary Examiner* — Liang Che A Wang
(74) *Attorney, Agent, or Firm* — J.C. Patents

(57) ABSTRACT

A method for managing a software service, and a server are provided in the present disclosure. The method is suitable for operating in a software service system including a service manager. The service manager manages an existing software service in the software service system. The method includes: obtaining a first service deployment descriptor of a new software service by using the service manager, where a format of the first service deployment descriptor is the same as a format of a second service deployment descriptor of the existing software service; defining a data exchange mechanism between the new software service and the existing software service according to the first service deployment descriptor of the new software service by using the service manager; and exchanging data with the new software service according to the data exchange mechanism by the existing software service.

13 Claims, 4 Drawing Sheets

(56) References Cited

U.S. PATENT DOCUMENTS

| | | | |
|---|---|---|---|
| 2003/0191823 A1* | 10/2003 | Bansal | H04L 69/329 709/220 |
| 2005/0165906 A1* | 7/2005 | Deo | H04L 41/5054 709/217 |
| 2007/0157296 A1* | 7/2007 | Lioy | H04L 63/08 726/6 |
| 2007/0294364 A1 | 12/2007 | Mohindra et al. | |
| 2008/0168424 A1 | 7/2008 | Mohindra et al. | |
| 2009/0248461 A1* | 10/2009 | Bartsch | G06Q 10/06312 705/7.27 |
| 2010/0125477 A1* | 5/2010 | Mousseau | G06F 9/5077 717/177 |
| 2010/0202450 A1* | 8/2010 | Ansari | H04L 12/2814 370/389 |
| 2013/0166703 A1* | 6/2013 | Hammer | H04L 63/10 709/220 |
| 2014/0372533 A1* | 12/2014 | Fu | G06F 9/5072 709/204 |
| 2018/0115468 A1* | 4/2018 | Bildhauer | H04L 41/5058 |
| 2018/0270122 A1* | 9/2018 | Brown | H04L 69/40 |
| 2019/0018670 A1* | 1/2019 | Ramasamy | H04L 41/082 |
| 2019/0102238 A1* | 4/2019 | Caldato | G06F 11/3644 |
| 2020/0213187 A1* | 7/2020 | Padmanabhan | H04L 41/0806 |

\* cited by examiner

METHOD FOR MANAGING SOFTWARE SERVICE, AND SERVER

CROSS-REFERENCE TO RELATED APPLICATION

This application claims the priority benefit of Taiwan application serial no. 108121313, filed on Jun. 19, 2019. The entirety of the above-mentioned patent application is hereby incorporated by reference herein and made a part of this specification.

BACKGROUND

Technical Field

The present disclosure relates to a method for managing a software service, and a server, and in particular, to a method for managing a software service and a server that are used for deploying a new software service.

Related Art

Generally, when a manager intends to deploy a new software service on a software service system, related configurations need to be performed on the new software service and an existing software service in the system, to ensure that the new software service and the existing software service in the system can be operated successfully, thus completing the deployment of the new software service.

There is no standard deployment method for configurations of a common software service. Therefore, each time when the manager intends to deploy a new software service, each existing software service needs to be specifically configured, to successfully deploy the new software service into the system, thereby allowing each existing software service to exchange data with the new software service. However, this method is relatively complex and is not beneficial to the management of the system.

SUMMARY

Accordingly, the present disclosure provides a method for managing a software service and a server, which are used for resolving the foregoing technical problems.

The present disclosure provides a method for managing a software service, suitable for operating in a software service system including a service manager. The service manager manages an existing software service in the software service system. The method includes: obtaining a first service deployment descriptor of a new software service by the service manager, where a format of the first service deployment descriptor is the same as a format of a second service deployment descriptor of the existing software service; defining a data exchange mechanism between the new software service and the existing software service according to the first service deployment descriptor of the new software service by the service manager; and exchanging data with the new software service according to the data exchange mechanism by the existing software service.

The present disclosure provides a server, on which a service manager is operated, the service manager managing an existing software service in a software service system. The server includes a storage circuit and a processor. The storage circuit includes a plurality of modules. The processor is coupled to the storage circuit, to access the modules to perform the following steps: operating the service manager to obtain a first service deployment descriptor of a new software service, where a format of the first service deployment descriptor is the same as a format of a second service deployment descriptor of the existing software service; operating the service manager to define a data exchange mechanism between the new software service and the existing software service according to the first service deployment descriptor of the new software service; and controlling the existing software service to exchange data with the new software service according to the data exchange mechanism.

Based on the foregoing descriptions, the method provided in the present disclosure can allow the service manager to inform another existing software service of a data exchange mechanism for communication with the new software service based on content of the first service deployment descriptor of the new software service. In this way, after the new software service is deployed into the software service system, the existing software service can successfully exchange data with the new software service.

In order to make the aforementioned features and advantages of the present disclosure more comprehensible, embodiments are further described in detail hereinafter with reference to accompanying drawings.

DETAILED DESCRIPTION

Figure 1:
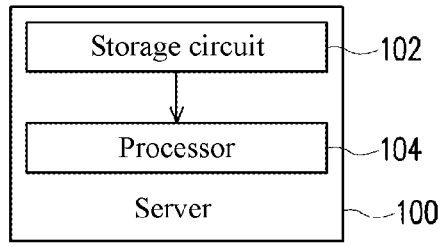
FIG. 1 is a schematic diagram of a server according to an embodiment of the present disclosure.

FIG. 1 is a schematic diagram of a server according to an embodiment of the present disclosure. In this embodiment, a server 100, for example, may be configured to operate a service manager in a software service system, and the service manager may be configured to perform the method for managing a software service proposed in the present disclosure. In another embodiment, the software service system may also be implemented on multiple servers. The service manager may be freely operated on the servers and assigns a required operation resource, for example, a hardware resource, to a software service according to a requirement of the software service. However, this is not limited thereto.

As shown in FIG. 1, the server 100 may include a storage circuit 102 and a processor 104. The storage circuit 102, for example, may be any type of fixed or removable random access memory (RAM), a read-only memory (ROM), a flash memory, a hard disk, or other similar devices, or a combination of these devices, and may be configured to record a plurality of program code or modules.

The processor 104 is coupled to the storage circuit 102 and may be a general-purpose processor, a special-purpose processor, a conventional processor, a digital signal processor, a plurality of microprocessors, one or more microprocessors in combination with a core of the digital signal processor, a control unit, a micro control unit, an application specific integrated circuit (ASIC), a field programmable gate array (FPGA), any integrated circuit of another type, a state machine, a processor based on an advanced RISC machine (ARM), or the like.

In an embodiment of the present disclosure, the processor 104 may access modules and programs recorded in the storage circuit 102 to operate the service manager, thereby implementing the method for managing a software service proposed by the present disclosure, and details are described below.

Figure 2:
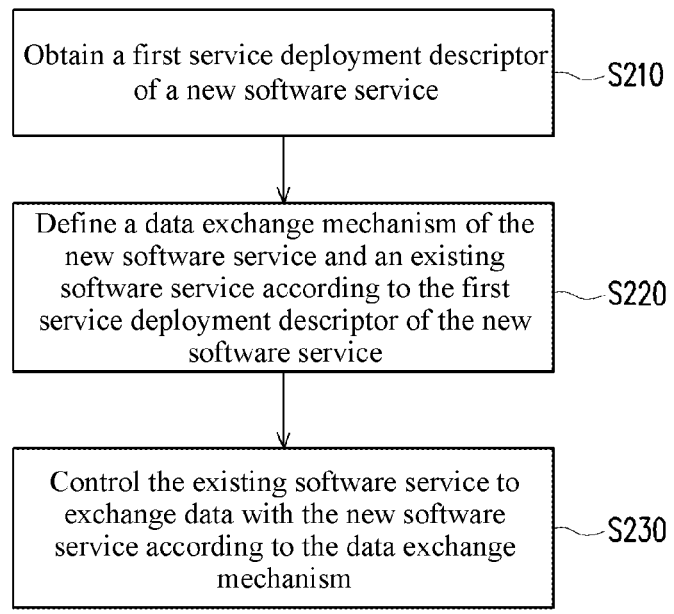
FIG. 2 is a flowchart of a method for managing a software service according to an embodiment of the present disclosure.

FIG. 2 is a flowchart of a method for managing a software service according to an embodiment of the present disclosure. The method in this embodiment may be performed by the server 100 in FIG. 1, and details of each step in FIG. 2 are described below with reference to elements shown in FIG. 1.

First, in step S210, the processor 104 may operate the service manager to obtain a first service deployment descriptor of a new software service. In different embodiments, the first service deployment descriptor of the new software service, for example, may include metadata (for example, a name and an identity) of the new software service, operation specifications (for example, an output port and an operation resource requirement), and the like. In addition, in some embodiments, since the new software service may include one or more application programming interfaces (API), the first service deployment descriptor of the new software service may also include service description of each API. Related details are described subsequently with reference to examples.

In this embodiment, the service manager may be used for managing one or more existing software services that have been deployed in the software service system in advance, and the existing software services may separately provide various functions through one or more APIs. In addition, similar to the new software service, the existing software services may also include their own service deployment descriptors. In the present disclosure, a format of the first service deployment descriptor of the new software service is the same as a format of the service deployment descriptor of the existing software service. From another point of view, the service deployment descriptors of the software services in the present disclosure may be understood as having a standard format. The reason lies in that, in a case that the first service deployment descriptor of the new software service and the service deployment descriptor of the existing software service use the same standard format, operations such as data exchange and communication between two parties can be performed without assistance of the service manager, and related transmission efficiency may be further improved. In order to make concept of the present disclosure clearer, FIG. 3 is used as another example for description, but it is not intended to limit possible implementations of the present disclosure.

Figure 3:
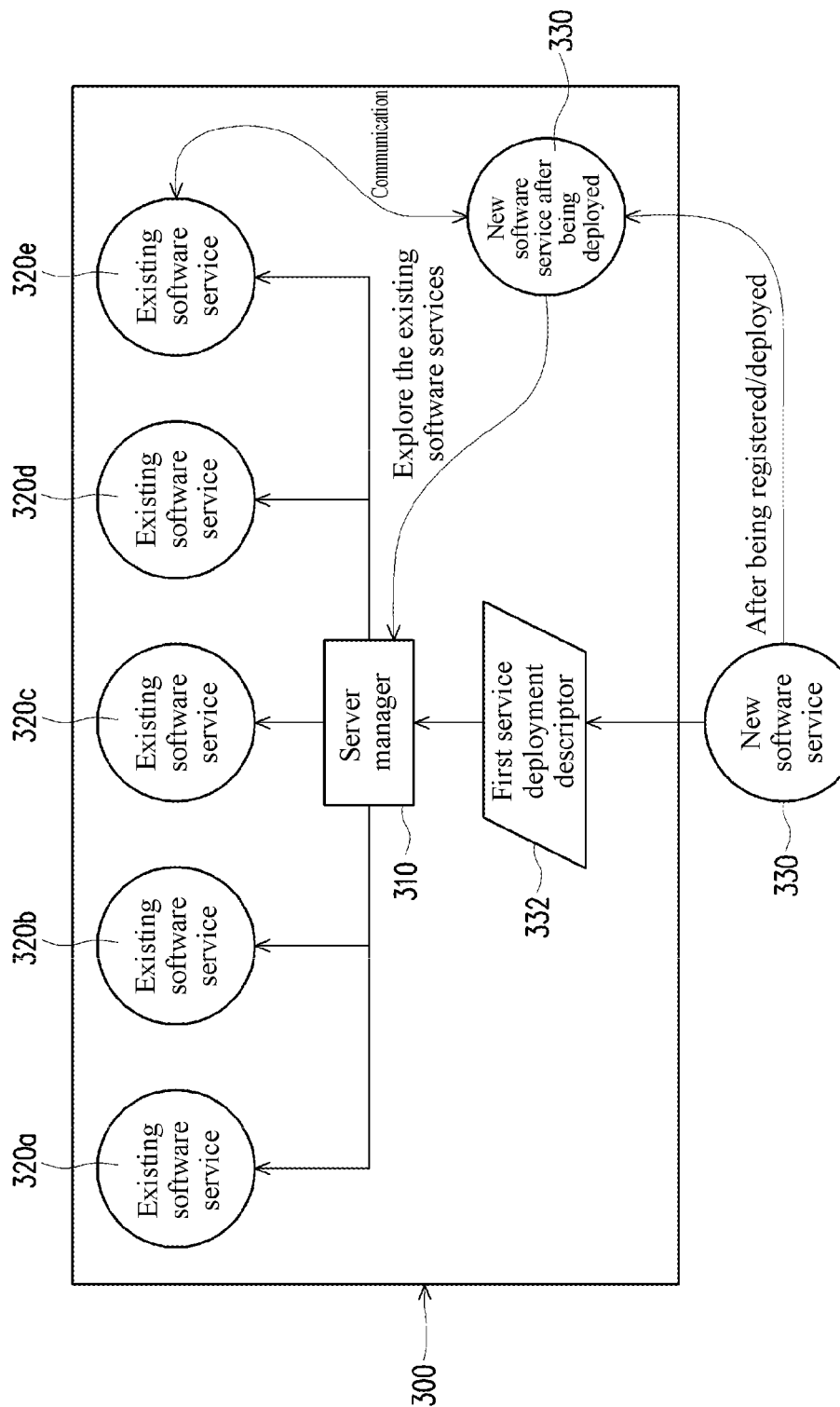
FIG. 3 is a schematic diagram of a software service system according to an embodiment of the present disclosure.

FIG. 3 is a schematic diagram of a software service system according to an embodiment of the present disclosure. As shown in FIG. 3, a software service system 300 may include a service manager 310, which may be used for centrally managing existing software services 320a, 320b, 320c, 320d, and 320e. In this embodiment, when a manager of the software service system 300 intends to deploy a new software service 330 in the software service system 300, the new software service 330 may be registered with the service manager 310. In this case, the service manager 310 may correspondingly obtain a first service deployment descriptor 332 of the new software service 330, and deploy the new software service 330 into the software service system 300 accordingly.

Specifically, in step S220, the processor 104 may define, according to the first service deployment descriptor 332 of the new software service 330, a data exchange mechanism between the new software service 330 and the existing software services 320a, 320b, 320c, 320d, and 320e. Then, in step S230, the processor 104 may control the existing software services 320a, 320d, 320c, 320d, and 320e to exchange data with the new software service 330 according to the data exchange mechanism.

Figure 4:
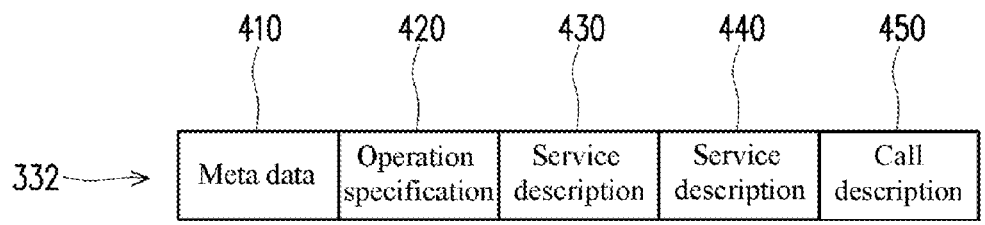
FIG. 4 is a schematic diagram of a service deployment descriptor according to FIG. 3.

FIG. 4 is a schematic diagram of a service deployment descriptor according to FIG. 3. In this embodiment, for example, the first service deployment descriptor 332 of the new software service 330 may be implemented by using the format of JavaScript object notation (JSON). In FIG. 4, the first service deployment descriptor 332, for example, may include metadata 410, an operation specification 420, a service description 430, a service description 440, and a call description 450 used for calling the existing software service.

In FIG. 4, the metadata 410, for example, includes a name (for example, "WEB") and an identity (for example, an identification code) of the new software service 330. The operation specification 420, for example, includes an output port and an operation resource requirement of the new software service 330. For example, the operation resource requirement of the new software service 330 includes one central processing unit (CPU), a 512 M memory, and a 1 G hard disk. In this case, when the service manager 310 obtains the operation resource requirement based on the first service deployment descriptor 332, the service manager 310 may call a hardware resource corresponding to the operation resource requirement from one or more servers (for example, the server 100) used for operating the software service system 300. In this way, after the new software service 330 is deployed into the software service system 300 (that is, the new software service 330 is registered with the service manager 310), the new software service 330 may use the hardware resource and work normally. However, the present disclosure is not limited thereto.

In addition, the new software service 330 in this embodiment, for example, may include a first service API, and the first service API may include a first version (for example, the service description 430) and a second version (for example, the service description 440).

The service description 430 may include a first data type of the first version of the first service API may be included. For example, the first data type may include input parameter information and output parameter information of the first version of the first service API.

In an embodiment, the input parameter information and the output parameter information of the first version are an integer and a bool respectively. That is, the input parameter information may be used for informing other existing software services to provide variables in an integer form as input parameters of the first version of the first service API, and the first version of the first service API may correspondingly return variables in a bool form as output parameters to the existing software services.

Similarly, the service description 440 may include a second data type of the second version of the first service API. For related details, reference may be made to the related description of the service description 430, and details are not repeated herein.

In the call description 450, a name of the existing software service that the new software service 330 intends to call and a specific version of a specific service API which is provided by the existing software service and to be accessed by the new software service 330 may be recorded.

In an embodiment, after the new software service 330 is deployed into the software service system 300, the new software service 330 may also enquire the service manager 310 how to access the existing software service in the software service system 300 based on the call description 450 (this may be referred to as exploring the existing software service). However, the present disclosure is not limited thereto.

It can be learned from the above description that, by using the service description of each version of the service API defined in the first service deployment descriptor 332 and the call descriptions used for calling other existing software services, the service manager 310 may inform other existing software services of a data type (for example, which form of variable needs to be provided) for communication with the new software service 330. In this way, after the new software service 330 is deployed into the software service system 300, the existing software services can successfully exchange data with the new software service 330.

In addition, in another embodiment, the first service deployment descriptor 332 may also be modified to include more/fewer service descriptions in response to the increase/decrease of the versions of the first API in the new software service 330. Besides, the call description 450 may also be adjusted to record more/less content in response to the requirement of the new software service 330 for calling other existing software services. In some embodiments, the first service deployment descriptor 332 may only include the service description of each version of the first API in the new software service 330, or only include the call description 450. However, the present disclosure is not limited thereto.

In an embodiment of the present disclosure, in addition to implementing the first service deployment descriptor 332 by using the standard format of JSON, the first service deployment descriptor may also be implemented by using another standard format, for example, a YAML format.

Figure 5:
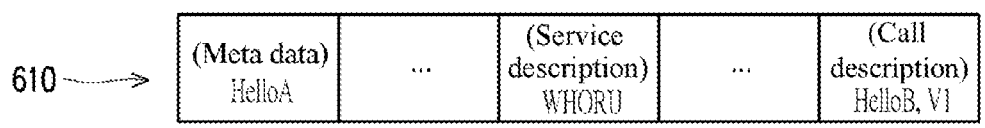
FIG. 5 is a diagram of a service deployment descriptor of a first software service according to an embodiment of the present disclosure.
Figure 6:
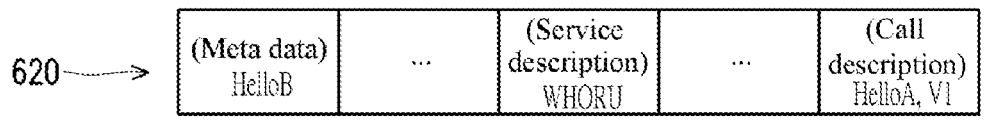
FIG. 6 is a diagram of a service deployment descriptor of a second software service according to an embodiment of the present disclosure.

In order to make the spirit of the present disclosure clearer, another specific embodiment is provided for further description. Referring to FIG. 5 and FIG. 6, FIG. 5 is a diagram of a service deployment descriptor of a first software service according to an embodiment of the present disclosure, and FIG. 6 is a diagram of a service deployment descriptor of a second software service according to an embodiment of the present disclosure.

It can be approximately learned from the service deployment descriptor 610 of the first software service in FIG. 5 that, the first software service is named "HelloA" and includes an API named "WHORU", and input parameter information and output parameter information of the API are, for example, null and string respectively. In addition, it can further be learned from the service deployment descriptor 610 that, the first software service can call the API of which the name is "HelloB" and the version is "V1". For meanings of other columns/content of the service deployment descriptor 610, reference may be made to the descriptions in the foregoing embodiments, and details are not repeated herein.

It can be approximately learned from the service deployment descriptor 620 of the second software service in FIG. 6 that, the second software service is named "HelloB" and includes an API named "WHORU", and input parameter information and output parameter information of the API are, for example, null and string respectively. In addition, it can further be learned from the service deployment descriptor 620 that, the first software service can call the API of which the name is "HelloA" and the version is "V1". For meanings of other columns/content of the service deployment descriptor 620, reference may be made to the descriptions in the foregoing embodiments, and details are not repeated herein.

Figure 7:
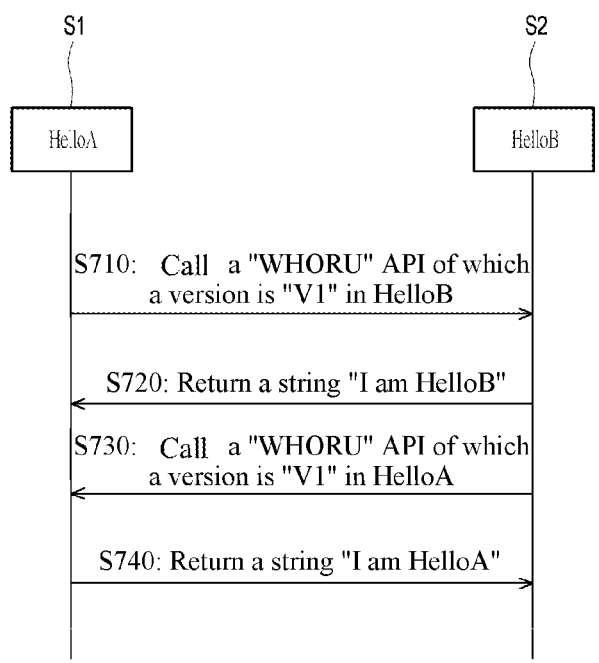
FIG. 7 is a schematic diagram of communication performed according to a data exchange mechanism defined by the service deployment descriptors according to FIG. 5 and FIG. 6.

FIG. 7 is a schematic diagram of communication performed according to a data exchange mechanism defined by the service deployment descriptors according to FIG. 5 and FIG. 6. In this embodiment, when a first software service S1 (which may correspond to the service deployment descriptor 610 in FIG. 5) and a second software service S2 (which may correspond to the service deployment descriptor 620 in FIG. 6) are not yet deployed into the software service system 300, the service manager 310 may first deploy, by using the method taught in the foregoing (that is, the method for deploying the new software service 330 into the software service system 300), the first software service S1 and the second software service S2 into the software service system 300 respectively according to the service deployment descriptors 610 and 620. In addition, the first software service S1 and the second software service S2 may separately enquire the service manager 310 how to access the existing software services in the software service system 300. However, the present disclosure is not limited thereto.

After the deployment is completed, the first software service S1 and the second software service S2 may respectively exchange data with the other party according to the data type recorded in the service deployment descriptors 610 and 620. By using FIG. 7 as an example, in step S710, the first software service S1 may call the "WHORU" API of which the version is "V1" of HelloB (that is, the name of the second software service S2) according to the call description recorded in the service deployment descriptor 610. Correspondingly, in step S720, the second software service S2 may return a string "I am HelloB" to the first software service S1 according to the output parameter information of "WHORU" recorded in the service deployment descriptor 620.

In addition, in step S730, the second software service S2 may call the "WHORU" API of which the version is "V1" of HelloA (that is, the name of the first software service S1) according to the call description recorded in the service deployment descriptor 620. Correspondingly, in step S740, the first software service S1 may return a string "I am HelloA" to the second software service S2 according to the output parameter information of "WHORU" recorded in the service deployment descriptor 610.

Based on the foregoing descriptions, when a new software service intends to register with the service manager in the software service system, the method provided in the present disclosure can allow the service manager to inform other existing software services of a data exchange mechanism for communication with the new software service according to the first service deployment descriptor of the new software service. In this way, after the new software service is deployed into the software service system, the existing software services can successfully exchange data with the new software service. More specifically, the method in the present disclosure can inform the existing software services of how to use the new software service, and inform the new software service of how to access the existing software services. According to the method in the present disclosure, the new software service can be successfully deployed into the system without performing specific configurations on each existing software service. Therefore, management efficiency of the software service system can be improved.

In addition, because the first service deployment descriptor of the new software service and the service deployment descriptor of the existing software service are in the same format, operations such as data exchange and communication between two parties can be performed without assistance of the service manager. Therefore, related transmission efficiency can be improved.

Although the present disclosure has been described with reference to the above embodiments, the embodiments are not intended to limit the present disclosure. Any person skilled in the art may make variations and improvements without departing from the spirit and scope of the present disclosure. Therefore, the protection scope of the present disclosure should be subject to the appended claims.

What is claimed is:

1. A method for managing a software service, suitable for operating in a software service system comprising a service manager, the service manager managing an existing software service in the software service system, and the method comprising: obtaining a first service deployment descriptor of a new software service by the service manager, wherein a format of the first service deployment descriptor is the same as a format of a second service deployment descriptor of the existing software service; defining a data exchange mechanism between the new software service and the existing software service according to the first service deployment descriptor of the new software service by the service manager; and exchanging data with the new software service according to the data exchange mechanism by the existing software service; wherein the first service deployment descriptor of the new software service comprises a name of the existing software service and a specific version of a specific service API, wherein the specific version is provided by the existing software service and to be accessed by the new software service.

2. The method according to claim 1, wherein the first service deployment descriptor of the new software service comprises at least one of a name and an identity of the new software service.

3. The method according to claim 1, wherein the first service deployment descriptor of the new software service comprises an output port of the new software service and an operation resource requirement of the new software service.

4. The method according to claim 3, further comprising: calling a hardware resource corresponding to the operation resource requirement of the new software service by the service manager from at least one server for use by the new software service.

5. The method according to claim 1, wherein the first service deployment descriptor of the new software service comprises a first service description of a first service application programming interface (API) of the new software service.

6. The method according to claim 5, wherein the first service description of the first service API comprises a first data type of a first version of the first service API.

7. The method according to claim 6, wherein the first data type comprises input parameter information and output parameter information of the first version of the first service API.

8. The method according to claim 7, wherein the data exchange mechanism comprises: providing an input parameter to the first version of the first service API according to the input parameter information of the first data type by the existing software service when the existing software service intends to access the first version of the first service API; and returning an output parameter corresponding to the output parameter information by the first version of the first service API to the existing software service according to the input parameter provided by the existing software service.

9. The method according to claim 6, wherein the service description of the first service API further comprises a second data type of a second version of the first service API.

10. The method according to claim 5, wherein the first service deployment descriptor of the new software service comprises a second service description of a second API of the new software service.

11. The method according to claim 1, wherein the first service deployment descriptor of the new software service comprises a call description used for calling the existing software service.

12. The method according to claim 1, wherein the data exchange mechanism comprises: accessing the specific version of the specific service API of the existing software service according to the call description by the new software service.

13. A server, on which a service manager is operated, the service manager managing an existing software service in a software service system, and the server comprising: a storage circuit, comprising a plurality of modules; and a processor, coupled to the storage circuit, and accessing the plurality of modules to perform the following steps: operating the service manager to obtain a first service deployment descriptor of a new software service, wherein a format of the first service deployment descriptor is the same as a format of a second service deployment descriptor of the existing software service; operating the service manager to define a data exchange mechanism between the new software service and the existing software service according to the first service deployment descriptor of the new software service; and controlling the existing software service to exchange data with the new software service according to the data exchange mechanism by the existing software service; wherein the first service deployment descriptor of the new software service comprises a name of the existing software service and a specific version of a specific service API, wherein the specific version is provided by the existing software service and to be accessed by the new software service.

* * * * *